(12) United States Patent  (10) Patent No.: US 6,669,258 B1
Kato                       (45) Date of Patent:     Dec. 30, 2003

(54) GUIDE MECHANISM, OPEN-CLOSE MECHANISM OF COVERING MEMBER USING THE GUIDE MECHANISM, INTERIOR EQUIPMENT FOR AUTOMOBILE USING THE OPEN-CLOSE MECHANISM

(75) Inventor: Masakatsu Kato, Tokyo (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/370,598

(22) Filed: Feb. 24, 2003

(30) Foreign Application Priority Data

Mar. 22, 2002 (JP) ........................ 2002-081196

(51) Int. Cl.$^7$ ................................. B60J 9/00
(52) U.S. Cl. ................. 296/1.01; 296/37.9; 296/37.12; 296/24.1; 296/37.8; 360/132
(58) Field of Search .............. 296/1.01, 37.12, 296/37.8, 37.9, 24.1; 360/132

(56) References Cited

U.S. PATENT DOCUMENTS

| | | | | |
|---|---|---|---|---|
| 1,999,970 A | * | 4/1935 | Visser | 296/37.9 |
| 2,159,062 A | * | 5/1939 | Visser | 296/37.9 |
| 2,174,244 A | * | 9/1939 | Jacobs | 296/37.9 |
| 2,196,372 A | * | 4/1940 | Visser | 296/37.9 |
| 3,600,051 A | * | 8/1971 | De Boer | 296/37.9 |
| 4,239,277 A | * | 12/1980 | Oda | 296/37.12 |
| 4,392,683 A | * | 7/1983 | Bassi | 296/37.9 |
| 4,596,416 A | * | 6/1986 | Muller | 296/37.12 |
| 4,712,845 A | * | 12/1987 | Nicol | 296/37.9 |
| 4,743,060 A | * | 5/1988 | Hishida | 296/37.12 |
| 4,786,098 A | * | 11/1988 | Jobmann et al. | 296/37.12 |
| 5,018,800 A | * | 5/1991 | Cziptschirsch et al. | 296/37.9 |
| 5,078,567 A | * | 1/1992 | Lombardo | 296/24.1 |
| 5,228,611 A | * | 7/1993 | Yabuya | 296/37.12 |
| 5,533,772 A | * | 7/1996 | Volkers et al. | 296/37.9 |
| 5,800,005 A | * | 9/1998 | Arold et al. | 296/37.12 |
| 5,887,930 A | * | 3/1999 | Klein | 296/37.12 |
| 5,971,463 A | * | 10/1999 | Nowak et al. | 296/37.9 |
| 6,011,675 A | * | 1/2000 | Shima et al. | 360/132 |
| 6,131,242 A | * | 10/2000 | Zipperle et al. | 296/37.9 |
| 6,213,533 B1 | * | 4/2001 | Widulle et al. | 296/37.9 |
| 2003/0080131 A1 | * | 5/2003 | Fukuo | 296/37.12 |
| 2003/0127877 A1 | * | 7/2003 | Luginbill et al. | 296/37.8 |

FOREIGN PATENT DOCUMENTS

| | | | |
|---|---|---|---|
| DE | 32 18 178 | * | 11/1983 |
| DE | 32 42 605 | * | 5/1984 |
| DE | 37 08744 | * | 4/1988 |
| DE | 10055183 | * | 5/2002 |
| FR | 2 561 183 | * | 9/1985 |
| JP | 5 294180 | * | 11/1993 |
| JP | 5 345548 | * | 12/1993 |

* cited by examiner

*Primary Examiner*—Kiran Patel
(74) *Attorney, Agent, or Firm*—Kanesaka & Takeuchi

(57) ABSTRACT

A guide mechanism includes a moving member having the first guide projections and the second guide projection arranged in a triangle shape. A supporting base member for supporting the moving member includes the first guide groove and the second guide groove formed in parallel. Each end portion of the first and second guide grooves includes an arc-shaped branch groove. The first guide projections are inserted into the first guide groove, and the second guide projection is inserted into the second guide groove. The guide projections slide inside the guide grooves and the branch grooves, thereby guiding sliding and turning motions of the moving member.

8 Claims, 7 Drawing Sheets

GUIDE MECHANISM, OPEN-CLOSE MECHANISM OF COVERING MEMBER USING THE GUIDE MECHANISM, INTERIOR EQUIPMENT FOR AUTOMOBILE USING THE OPEN-CLOSE MECHANISM

BACKGROUND OF THE INVENTION AND RELATED ART STATEMENT

The present invention relates to a guide mechanism for guiding a sliding motion and a turning motion of a moving member in case that a covering member for closing an opening of a device such as interior equipment in an automobile or a board-like object taken out from a storage portion slides linearly and turns at an end of the sliding, and also relates to an open-close mechanism of a covering member using the guide mechanism and an interior equipment for an automobile using the open-close mechanism.

Conventionally, an interior equipment such as a cup-holder, an ashtray, and various types of glove compartment is installed in an instrument panel of an automobile. Also recently, a liquid crystal display panel of a car navigation system may be installed in the instrument panel. In this case, a covering member is usually attached to the ashtray or the various types of glove compartment. The covering member for protection may also be attached to the liquid crystal display panel of the car navigation system, as it is preferred that the panel is protected with the covering member when the system is not used.

In this case, when the covering member is opened and the glove compartment and the car navigation system are used, the opened covering portion sometimes becomes an obstacle. Especially in the case of the liquid crystal display panel of the car navigation system, the covering member may block the display panel. Additionally, the liquid crystal display panel of the car navigation system is used in a state where the covering member is opened for a long time, so that it is preferred that the opened covering member is stored into the instrument panel.

In order to store the covering member in the instrument panel, a storage method has been proposed. In such a method, after a board-like covering member is turned to open, the board-like covering member is pulled (or pushed) from the instrument panel by sliding while holding in a horizontal position or vertical position, thereby saving a storage space. Conventionally, as an example of this type of the open-close mechanism wherein the covering member slides after turning, Japanese Patent Publication (KOKAI) No. 11-20552 discloses a mechanism for opening and closing a covering member of a console box, as shown in FIGS. 7(A) and 7(B).

The conventional open-close mechanism shown in FIGS. 7(A) and 7(B) includes two guide grooves b1, b2 parallel along the vertical direction on both side surfaces of a box main body a, and an arc-shaped connecting groove b3 connecting the both guide grooves b1, b2 at upper ends thereof. Also, a covering member c has a tongue-shaped supporting pieces d projecting at both sides of one end thereof, and two guide projections e1, e2 projecting on the supporting piece d. The covering member c is attached to the box main body a by inserting the guide projections e1 and e2 to each of the guide grooves b1, b2.

The open-close mechanism shown in FIG. 7(A) is in a state where the covering member c is closed and both guide projections e1, e2 are located inside the guide groove b1. When the covering member c is opened, as shown with a dot line in FIG. 7(A), an edge of the covering member c is lifted so that the covering member c is turned around the guide projection e1. At this time, the guide projection e2 moves into the connecting groove b3. Then, when the covering member c is turned to a nearly vertical position and an opening surface of the box main member c is completely opened, as shown with a dot line in FIG. 7(B), the guide projection e2 moves to a top edge part of the guide groove b2, and both guide projections e1, e2 are fitted in the guide grooves b1, b2, respectively. Then, the covering member c is pushed downward, so that both guide projections e1, e2 slide downward inside both guide grooves b1, b2, respectively. Accordingly, the covering member c is stored as sliding downward along one side of the box main body.

In case that the covering member c is closed from the state shown with a solid line in FIG. 7(B), both guide projections e1, e2 slide upward inside both guide grooves b1, b2, and the covering member c is pulled out, as shown with the dot line in FIG. 7(B). When the guide projections e1, e2 reach the top edge part of the guide grooves b1, b2, as shown with the dot line in FIG. 7(A), the covering member c is turned to the closed direction around the guide projection e1. At this time, the guide projection e2 moves into the connecting groove b3 from the guide groove b2, and moves to the connecting groove b1 through the connecting groove b3, as shown with a solid line in FIG. 7(A). Accordingly, the covering member c is closed completely, and both guide projections e1, e2 are located inside the guide groove b1.

However, this conventional open-close mechanism tends to be unstable in the open-close motion, especially opening from the closed state, thereby making it difficult to open the covering member c smoothly.

As shown in FIG. 7(A), when the covering member c is in the closed state, both guide projections e1 and e2 are located inside the guide groove b1 and can slide downward inside the guide groove b1, so that the covering member c is liable to wobble in an arrow direction f shown in FIG. 7(A).

Thus, when the covering member c is turned in the opening direction, the guide projection e1 that is the center of the turn becomes unstable due to the wobbling of the covering member c, thereby making the turning motion unstable. At the same time, because the guide projection e2 is shifted due to the wobbling, the guide projection e2 may not be able to move into the connecting groove b3 smoothly and may be caught at a corner between the guide groove b1 and the connecting groove b3, thereby making it difficult to open the covering member c smoothly.

The present invention has been made in considering the above-mentioned problems. An object of the present invention is to provide a guide mechanism for reliably guiding the sliding and turning motions so that a moving member can slide and turn smoothly in case that the moving member such as the covering member of the interior equipment for the automobile slides and turns at the end of the slide motion.

Another object of the present invention is to provide an open-close mechanism for the covering member using the guide mechanism and interior equipment for the automobile using the open-close mechanism.

Further objects and advantages of the invention will be apparent from the following description of the invention.

SUMMARY OF THE INVENTION

In order to achieve the above-mentioned objects, the present invention provides a guide mechanism for guiding the sliding and turning motions of a moving member in case that the moving member slides relative to a supporting base member and turns relative to the supporting base member at an end of the sliding motion. The supporting base member is provided with the first guide groove and the second guide groove parallel to each other. An arc-shaped branch groove is provided at each of ends of the first and second guide grooves, respectively. The moving member is provided with two first guide projections and the second guide projection, and the three guide projections are disposed in a triangle shape. The two first guide projections are inserted into the first guide groove and the second guide projection is inserted into the second guide groove. The moving member is guided to slide as the first guide projections and the second guide projection slide inside the first guide groove and the second guide groove, respectively. At one end of each of the guide grooves, one of the first guide projections moves into the arc-shaped branch groove of the first guide groove and slides inside the branch groove. Also, the second guide projection moves into the arc-shaped branch groove of the second guide groove and slides inside the branch groove, so that the moving member is guided to be able to turn around the other of the first guide projection.

In the guide mechanism of the present invention, the two first guide projections and the second guide projection are disposed on the moving member such as a covering member in a triangle shape. Further, the supporting base member supporting the moving member includes the first guide groove and the second guide groove in parallel, and the arc-shaped branch groove is formed at each end of the first and second guide grooves. The first guide projections are inserted into the first guide groove, and the second guide projection is inserted into the second guide groove.

The first and second guide projections slide inside the first and second guide grooves, respectively, so that the moving member is guided to slide along a predetermined path. When the moving member is turned at the ends of the guide grooves, one of the first guide projections moves into the arc-shaped branch groove provided at the end of the first guide groove, and the second guide projection moves into the arc-shaped branch groove provided at the end of the second guide groove. The one of the first guide projections and the second guide projection slide along an arc inside the branch grooves, respectively, so that the moving member is turned smoothly around the other of the first guide projections.

Moreover, in this invention, as described above, the moving member such as a covering member includes the three guide projections disposed in a triangle shape. When the moving member is turned, the moving member is guided as the one of the first guide projections and the second guide projection slide inside the branch grooves, respectively. Also, when the moving member slides, the first guide projections are guided along the first guide groove and the second guide projection is guided along the second guide groove. Therefore, as compared with the conventional mechanism as shown in FIG. 7 such that the turning is guided by one guide projection e1 and the sliding is guided by two guide projections e1, e2, it is possible to move the moving member smoothly.

As described above, in the guide mechanism of the present invention, when the moving member such as a covering member is turned, one of the first guide projections and the second guide projection slide inside the respective arc-shaped branch grooves. When the moving member is positioned at the end of the turning such as when the covering member is closed, each of the two guide projections is located in each branch groove, thereby preventing a wobbling of the moving member in the sliding direction. In addition, when the moving member is turned to slide from the end of the turning motion, the two guide projections move to the first and the second guide grooves for guiding the sliding motion from a state where the two guide projections are located inside the branch grooves while sliding inside the arc-shaped branch grooves according to the turning motion of the moving member. As a result, the turning motion shifts to the sliding motion smoothly without the guide projection being caught inside the sliding groove as in the conventional open-close mechanism of the covering member.

Therefore, according to the guide mechanism of the present invention, when the moving member slides and turns at the end of the sliding such as a covering member of the interior equipment for an automobile, the sliding motion and the turning motion can be guided reliably and stably, so that the moving member can slide and turn smoothly. Further, in addition to the guide mechanism, the present invention provides the following aspects of an open-close mechanism of a covering member using the guide mechanism and an interior equipment for an automobile using the open-close mechanism.

More specifically, with the guide mechanism as described above, the present invention provides an open-close mechanism of a covering member. The open-close mechanism of the covering member opens and closes an opening provided in the supporting base member while guiding the sliding motion and the turning motion of the covering member. The supporting base member is provided with the first guide groove and the second guide groove parallel to each other. An arc-shaped branch groove is provided at each of the ends of the first and second guide grooves, respectively. The covering member is provided with two first guide projections and the second guide projection, and the three guide projections are disposed in a triangle shape. The two first guide projections are inserted into the first guide groove and the second guide projection is inserted into the second guide groove. The covering member is guided to slide as the first guide projections and the second guide projection slide inside the first guide groove and the second guide groove, respectively. At the ends of the guide grooves, one of the first guide projections moves into the arc-shaped branch groove of the first guide groove and slides inside the branch groove. Also, the second guide projection moves into the arc-shaped branch groove of the second guide groove and slides inside the branch groove, so that the covering member is guided to be able to turn around the other of the first guide projection.

Further, the present invention provides the interior equipment for an automobile in which the covering member with the above-mentioned open-close mechanism is provided for opening and closing an opening of a box-shape main body of the interior equipment.

BRIEF DESCRIPTION OF THE DRAWINGS

FIGS. 7(A) and (B) are schematic views showing an embodiment of a storage box using a conventional open-close mechanism (guide mechanism) of the covering member, wherein FIG. 7(A) shows a state where the covering member is closed.

DETAILED DESCRIPTION OF PREFERRED EMBODIMENTS

Hereunder, embodiments of the present invention will be described with reference of the accompanied drawings. FIGS. 1–4 show interior equipment for an automobile in which a covering member (moving member) 2 opens and closes an opening of a box-shape main body (supporting base member) 1 with a guide mechanism of the present invention. In the interior equipment for the automobile, the box-shape main body 1 is installed inside an instrument panel i of an automobile, and, for example, a liquid crystal display panel of a car navigation system is disposed inside the box-shape main body 1.

The box-shape main body (supporting base member) 1 is formed in a box shape, and has a curved front surface with an opening. Further, an upper wall and upper portions of both sides of the box-shape main body extend toward backside. Elongated board-shaped attachment pieces 11 formed in a roughly zigzag shape project at front portions of the both sides. The box-shape main body 1 is fixed inside the instrument panel i by screws (not shown) through screw holes 111 provided in the attachment pieces 11.

Figure 1:
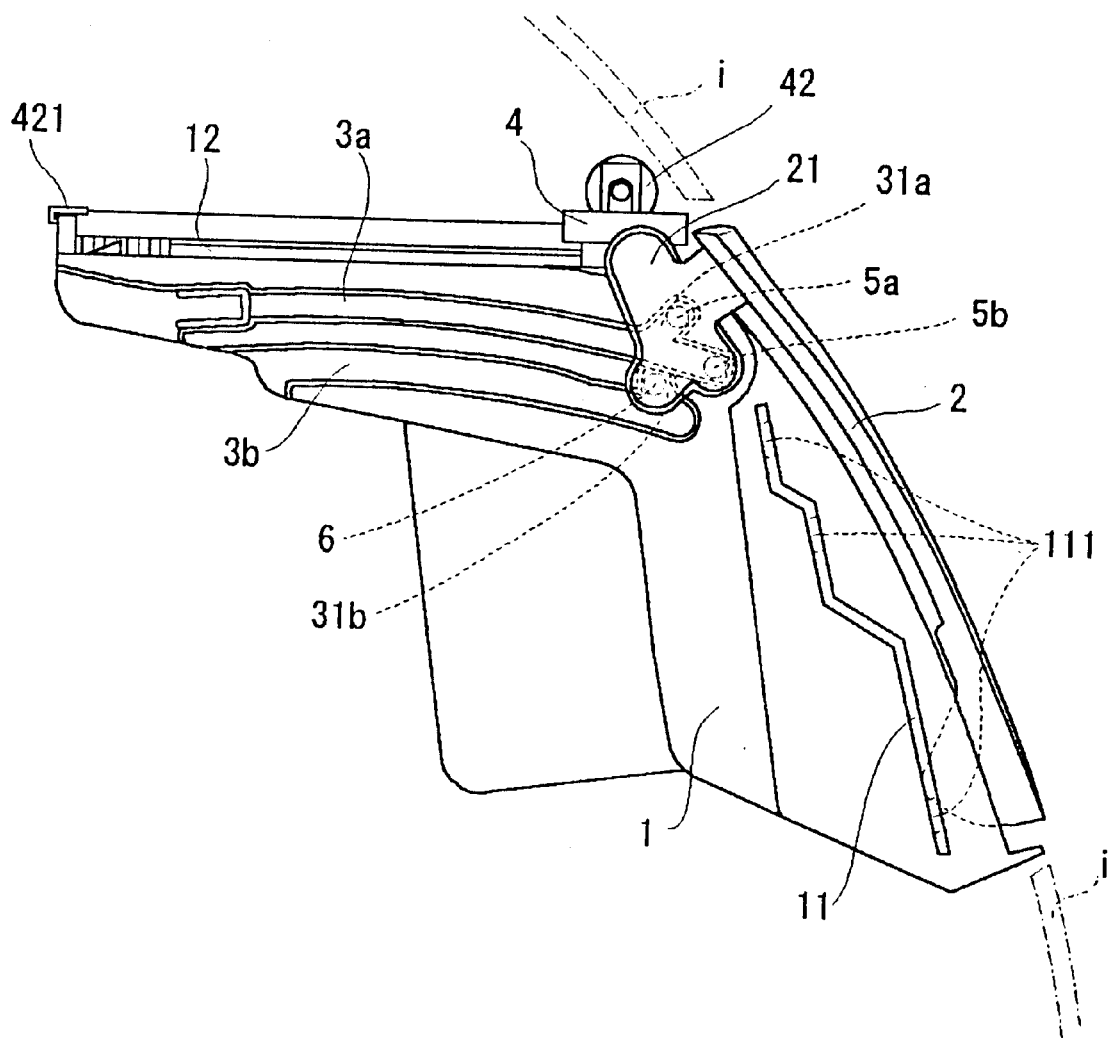
FIG. 1 is a side view showing an interior equipment for an automobile in a closed state as an example in which a covering member opens and closes with an open-close mechanism using a guide mechanism of the present invention.
Figure 2:
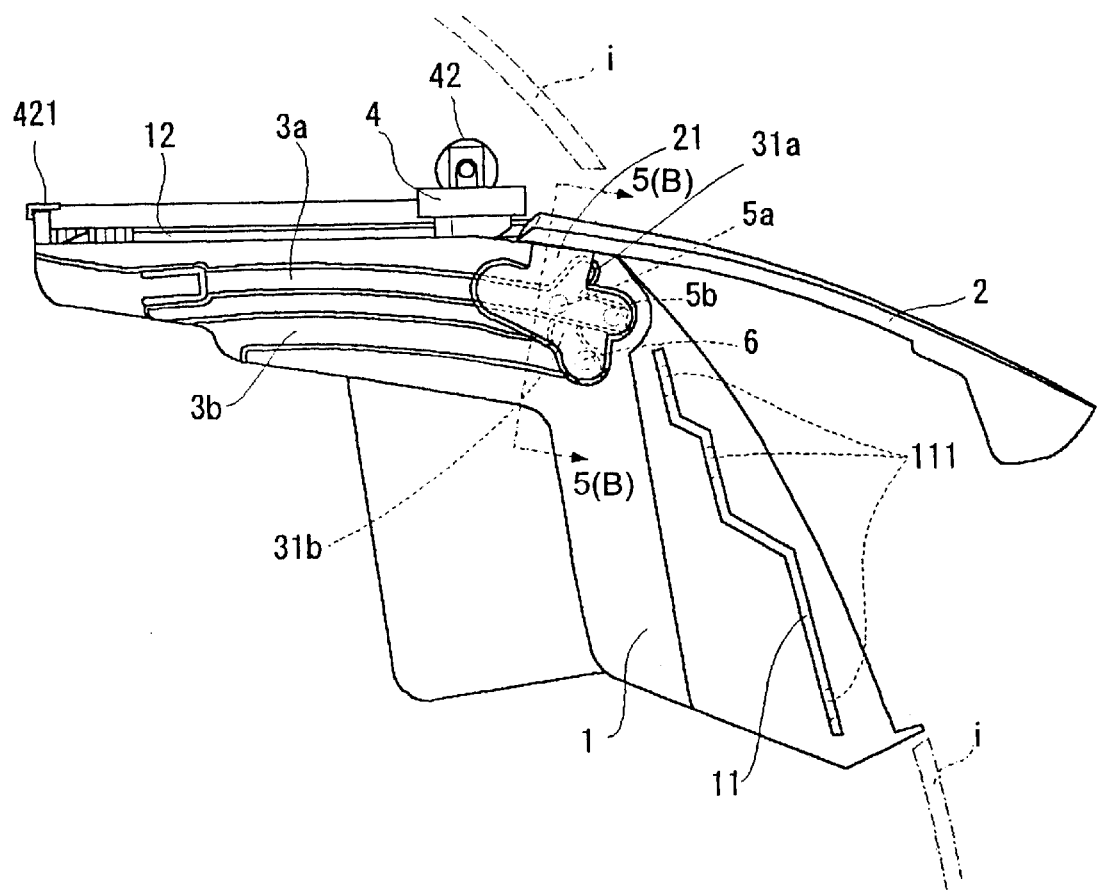
FIG. 2 is a side view showing a state where the covering member of the interior equipment for the automobile turns to open.
Figure 3:
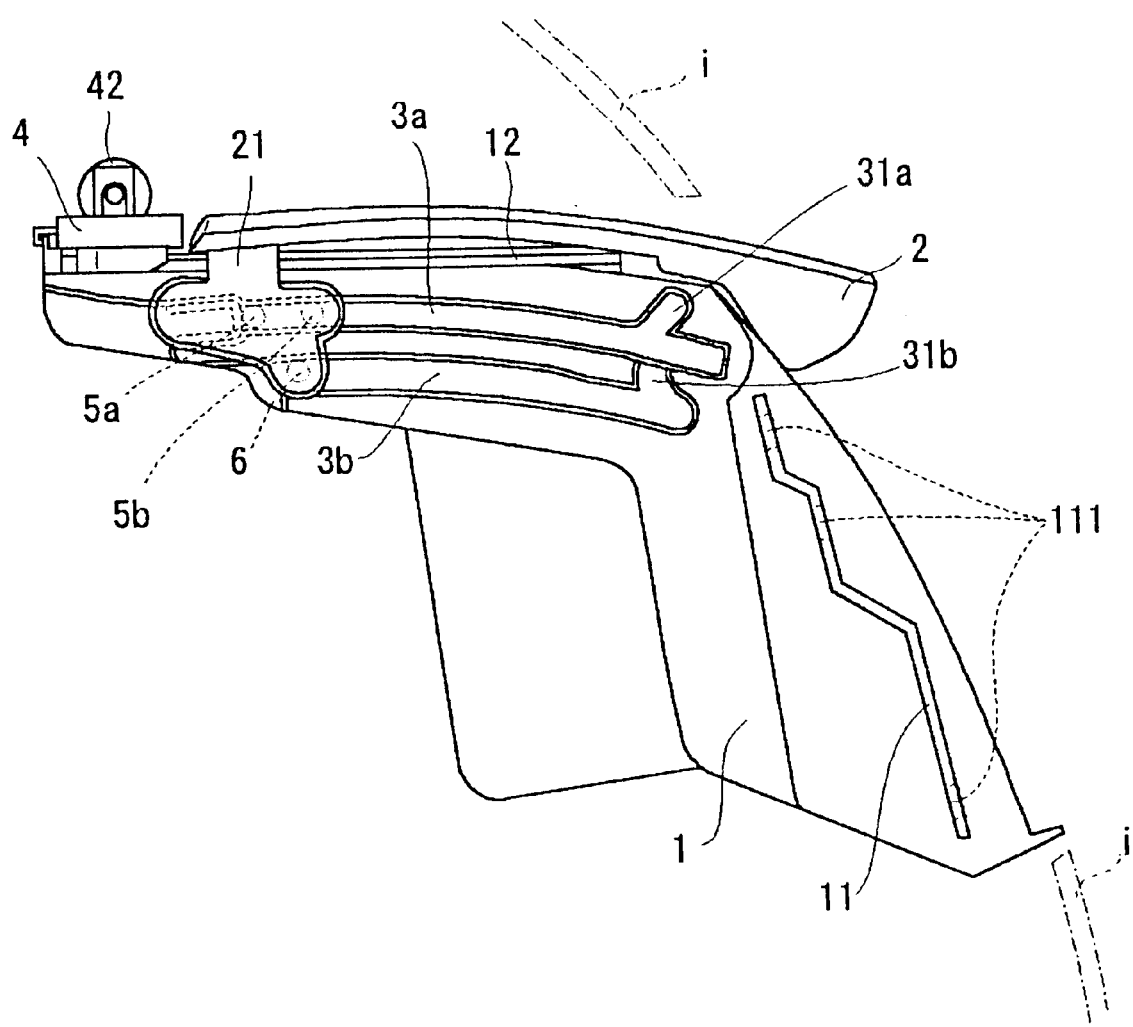
FIG. 3 is a side view showing a state that the covering member of the interior equipment slides to be stored.

As shown in FIGS. 1–3, the first guide groove 3a and the second guide groove 3b are provided at upper portions of the both sides of the box-shape main body 1. An arc-shaped branch groove 31a is provided at the front side of the first guide groove 3a slightly toward the backside. An arc-shaped branch groove 31b is also provided and branched from the front side of the second guide groove 3b. In this case, as shown in FIG. 5(B), the first and second guide grooves 3a, 3b and the branch grooves 31a, 31b are formed of thin walls 32 projecting from an outer side surface of the box-shape main body 1, and spaces between the thin walls 32 form the guide grooves.

Figure 4:
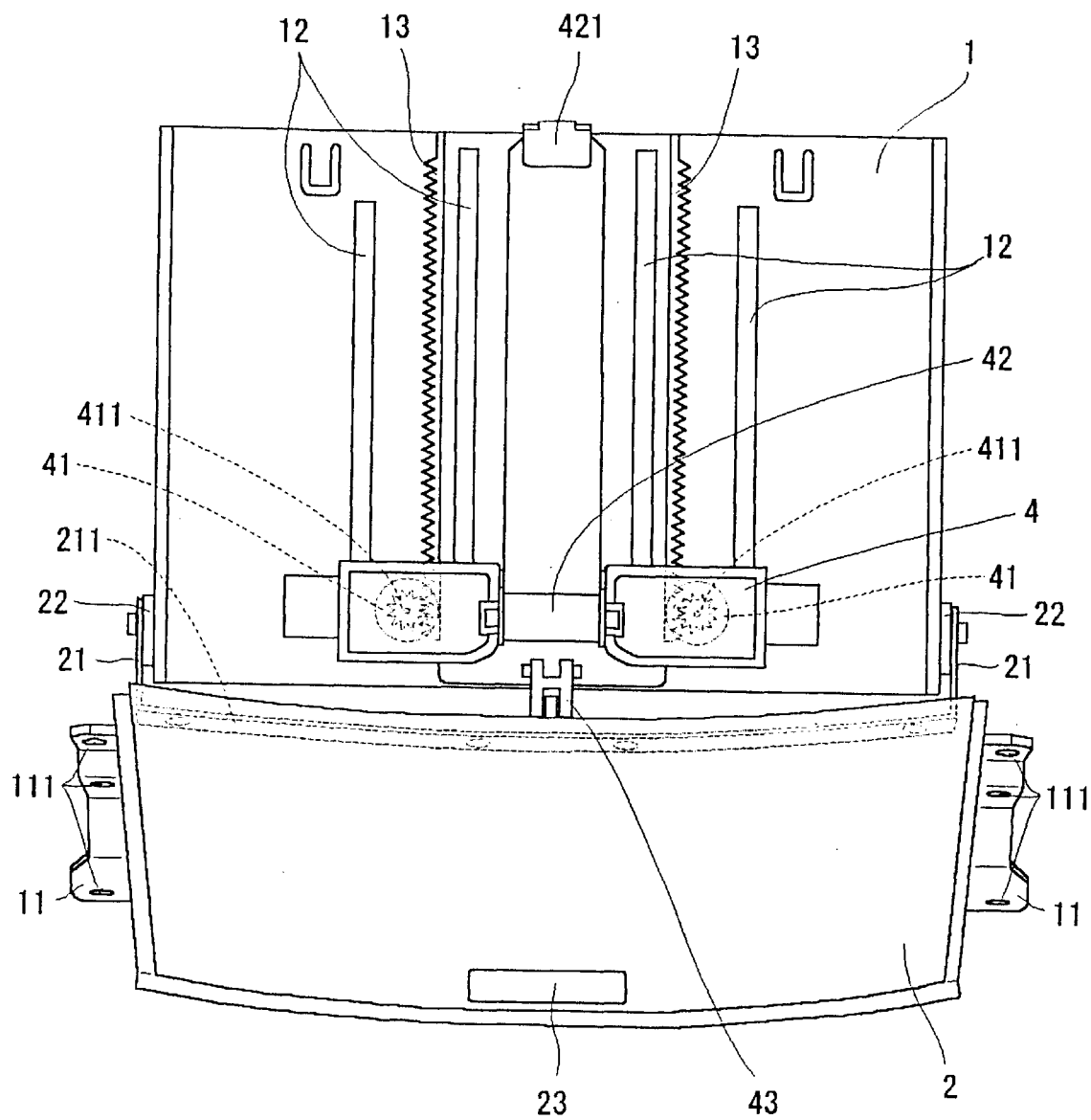
FIG. 4 is a plan view showing the interior equipment for the automobile.

As shown in FIG. 4, four slide rails 12 are formed in a front-rear direction on an upper surface of the box-shape main body 1, and slide members 4 are attached to the slide rails 12 to be movable in the front-rear direction. Additionally, two rack gears 13 are formed on the upper surface of the box-shape main body 1 along the slide rails 12, and pinion gears 411 of oil dampers 41 attached to the sliding member 4 engage the rack gears 13. Moreover, a Conston spring (driving source) 42 is attached to the sliding member 4, and an edge 421 of the Conston spring 42 is latched to a back end of the upper surface of the box-shape main body 1. The Conston spring 42 urges the sliding member 4 toward the backside. In addition, a connecting member 43 is attached to a center of a front edge of the sliding member 4 to be able to slide. An inner surface at a center of the top edge of the covering member 2 is connected to an end of the connecting member 43 to be able to turn.

Supporting pieces 21 project on both upper side edges of the covering member 2 toward the backside. In inner faces of the supporting pieces 21, two first guide projections 5a, 5b to be inserted in the first guide groove 3a and the second guide projection 6 to be inserted in the second guide groove 3b project in a triangle shape.

The covering member 2 is disposed so that both supporting pieces 21 hold both sides of the box-shape main body 1. The two first guide projections 5a, 5b projecting from the supporting piece 21 are inserted inside the first guide groove 3a. The second guide projection 6 is inserted into the second guide groove 3b. The covering member 2 is attached to the box-shape main body 1 in a state that the inner face at the center of the upper edge thereof is rotatably attached to the connecting member 43 of the sliding member 4.

Figure 5A:
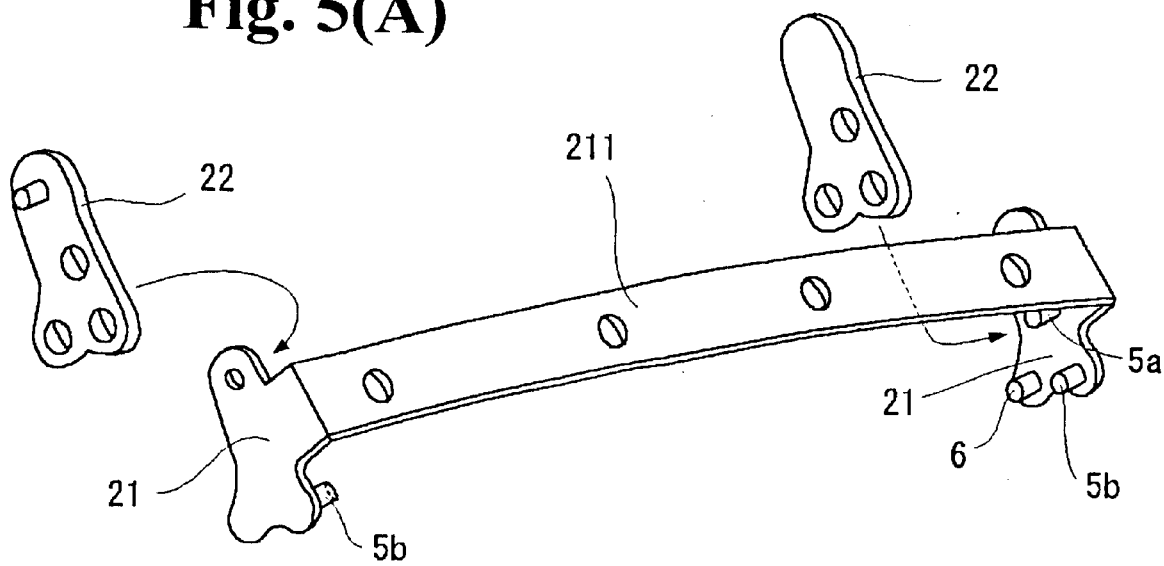
FIG. 5(A) is an exploded perspective view showing components of supporting pieces provided in the covering member of the interior equipment.
Figure 5B:
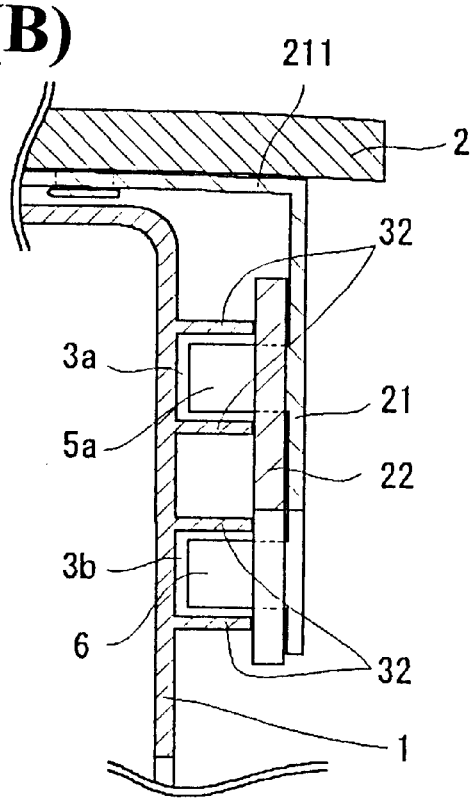
FIG. 5(B) is a cross sectional view taken along line 5(b)—5(b) in FIG. 2.

As shown in FIG. 5(A), the supporting pieces 21 are formed by bending a metal plate 211 in a U-shape, and the three guide projections 5a, 5b, and 6 are projected on the inner face at both edges. As shown in FIG. 4, the metal plate 211 is fixed to the upper inner face of the covering member 2, so that the supporting pieces 21 project from both edges of the covering member 2.

As shown in FIGS. 5(A) and 5(B), sliding plates 22 made of a material such as a fluorocarbon resin with an excellent sliding quality are attached to the inner faces of both supporting pieces 21. The guide projections 5a, 5b, and 6 project inwardly through holes of the sliding plates 22.

The supporting pieces 21 are provided at both ends of the metal plate 211 in a state where the supporting pieces 21 are bent inside by an angle slightly smaller than the right angle. The metal plate 211 is attached to the box-shape main body 1 in a state that the metal plate 211 is bent slightly outward. That is, the supporting pieces 21 abut against the side surfaces of the box-shape main body 1 with a predetermined pressure by an elastic force of the metal plate. At this time, as shown in FIG. 5(B), ends of the guide projections 5a, 5b, and 6 do not contact the bottoms of the guide grooves 3a, 3b, and the edges of the thin walls 32 of the guide grooves 3a and 3b linearly contact the sliding plate 22.

A locking mechanism (not shown) is disposed at a center of a lower edge of the covering member 2 for engaging an edge of the opening of the box-shape main body 1. Through this locking mechanism, the covering member 2 is locked in the closed position where the front opening of the box-shape main body 1 is closed, and the locked state may be unlocked by pushing a lock release button 23 provided at a lower center part of the front face of the covering member 2 (refer to FIG. 4).

Next, an operation and a motion of opening and closing the covering member 2 of the interior equipment for the automobile will be explained. The interior equipment for the automobile, as described above, is provided with the liquid crystal display panel (not shown) of the car navigation system inside the box-shape main body 1, and as shown in FIGS. 1–3, is attached to the inside of the instrument panel i of the automobile. As shown in FIG. 1, in a usual state (non-use state), the covering member 2 closes the opening of the front end of the box-shape main body 1, and is locked by the locking mechanism (not shown), thereby protecting the liquid crystal display panel (not shown).

At this time, one of the first guide projections 5a and the second guide projection 6 are located at ends of the branch groove 31a of the first guide groove 3a and the branch groove 31b of the second guide groove 3b, respectively. The other of the first guide projections 5b is located at a front part of the first guide groove 3a.

From this state, when the covering member 2 is opened to expose the liquid crystal display panel to use the car navigation system, the locking release button 23 (refer to FIG. 4) is pressed, so that the locking mechanism releases the covering member 2 from the locked state.

Figure 6A:
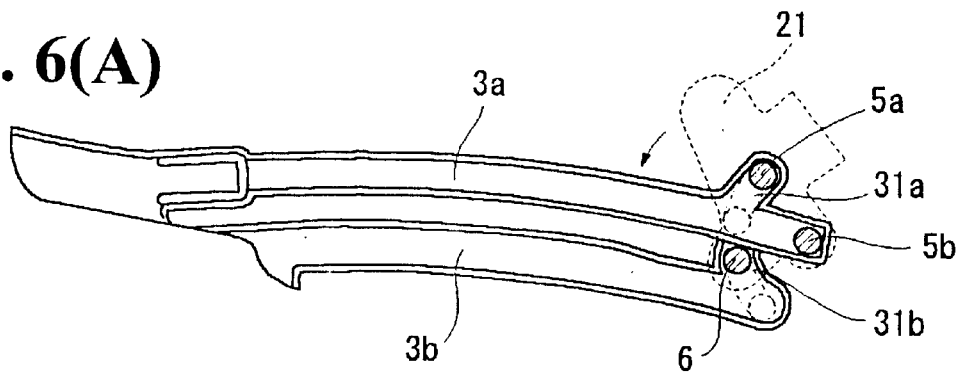
FIGS. 6(A) to 6(D) are sequential drawings for explaining a relation among the guide projections and guide grooves when the covering member of the interior equipment for the automobile turns and slides.
Figure 6B:
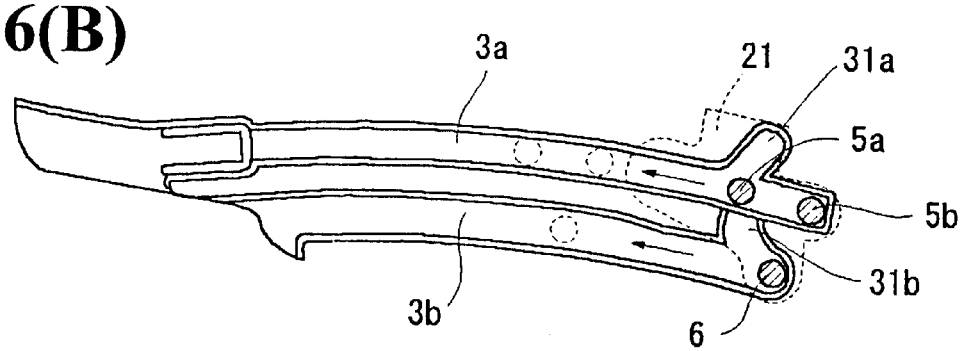

Accordingly, as shown in FIG. 2, the sliding member 4 moves backward with the urging force of the Conston spring 42, and the top edge of the covering member 2 is pulled backward. As shown in FIG. 6(A), the one of the first guide projections 5a and the second guide projection 6 are guided in the branch grooves 31a and 31b, respectively, and move downward along the arc of the branch grooves 31a and 31b. Then, as shown in FIG. 6(B), the guide projections move to the first guide groove 3a and the second guide groove 3b, respectively.

At this time, along the motions of the first guide projection 5a and the second guide projection 6, the covering member 2 turns in the opening direction around the other of the first guide projections 5b, and as shown in FIG. 2, and the front end of the box-shape main body 1 is opened.

Figure 6C:
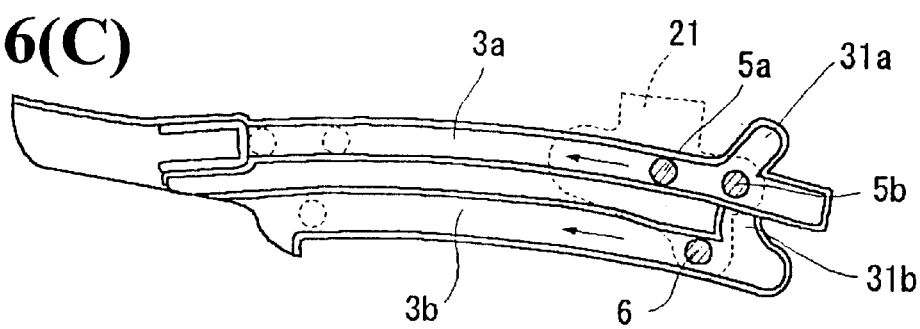
Figure 6D:
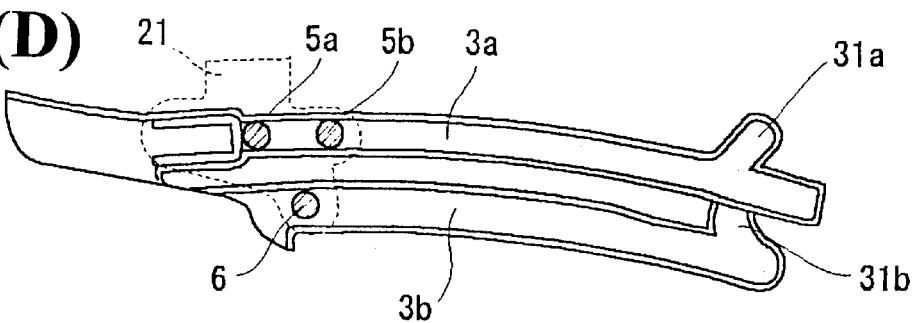

Then, the sliding member 4 is pulled backward again by the Conston spring 42, so that the covering member 2 is pulled backward. As shown in FIGS. 6(C) and 6(D), the first guide projections 5a and 5b are guided to slide backward inside the first guide groove 3a, and the second guide projection 6 is guided to slide backward inside the second guide groove 3b. The covering member 2 slides backward along the guide projections 5a, 5b, and 6, as shown in FIG. 3, thereby storing the covering member 2 inside the instrument panel i. Accordingly, the front face of the box-shape main body 1 is completely opened, and the liquid crystal display panel (not shown) installed inside the box-shape main body 1 becomes visible.

The sliding and turning motions of opening the covering member 2 is carried out automatically as the sliding member 4 moves backward with the urging force of the Conston spring 42. In this case, the motions are slow due to the oil dampers 41 provided in the sliding member 4 (refer to FIG. 4).

Next, when closing the covering member 2 and returning to the state in FIG. 1 from the state in FIG. 3, the edge of the covering member 2 projecting from the instrument panel i is grasped to pull out the covering member against the urging force of the Conston spring 42. At this time, the first guide projections 5a, 5b are guided to slide forward inside the first guide groove 3a. The second guide projection 6 is guided to slide forward inside the second guide groove 3b. The covering member 2 slides forward along the guide projections 5a, 5b, and 6, and projects from the instrument panel i as shown in FIG. 2. In this case, at an end of the siding motion, the first guide projection 5b and the second guide projection 6 reach the front ends of the first guide groove 3a and the second guide groove 3b (in the state in FIG. 6(B)), respectively.

After the covering member 2 is pulled out to the end of the sliding motion as described above, the covering member 2 is turned downward against the urging force of the Conston spring 42. The front opening of the box-shape main body 1 is covered with the covering member 2. Then, the inner face of the lower end of the covering member 2 where the locking mechanism (not shown) is disposed is pushed to fit to the opening of the box-shape main body 1, so that the locking mechanism engages the box-shape main body 1 to lock the covering member 2 in the closed state, i.e. the initial state in FIG. 1.

At this time, the one of the first guide projections 5a and the second guide projection 6 move into the arc-shaped branch grooves 31a, 31b from the first guide groove 3a and the second guide groove 3b, respectively, and slide inside the branch grooves 31a, 31b, and then return to the state in FIG. 6(A). The covering member 2 turns in the closing direction around the other first guide projection 5b along with the guide projections 5a and 6, to be closed.

In the open-close mechanism of the covering member for the interior equipment of the automobile, the guide mechanism for guiding the covering member 2 is provided with the first guide projections 5a, 5b and the second guide projection 6 in the triangle position. In the box-like base member 1 for supporting the covering member 2, the first guide groove 3a and the second guide groove 3b are provided parallel to each other. At the ends of the first and second guide grooves 3a, 3b, the arc-shaped branch grooves 31a, 31b are provided, respectively. The first guide projections 5a, 5b are inserted into the first guide groove 3a, and the second guide projection 6 is inserted into the second guide groove 3b.

The covering member 2 is guided to slide along the predetermined path as the first guide projections 5a, 5b and the second guide projection 6 slide inside the first guide groove 3a and the second guide groove 3b, respectively. Additionally, when the covering member 2 is turned in order to be opened and closed at the end (forward) of the sliding motion, the first guide projection 5a moves into the arc-shaped branch groove 31a provided at the end (front end) of the first guide groove 3a, and the second guide projection 6 moves into the arc-shaped branch groove 31b provided at the end (front end) of the second guide groove 3b. The first guide projection 5a and second guide projection 6 are guided to slide along the arc inside the branch grooves 31a, 31b, respectively, so that the covering member 2 turns smoothly around the first guide projection 5b.

Figure 7A:
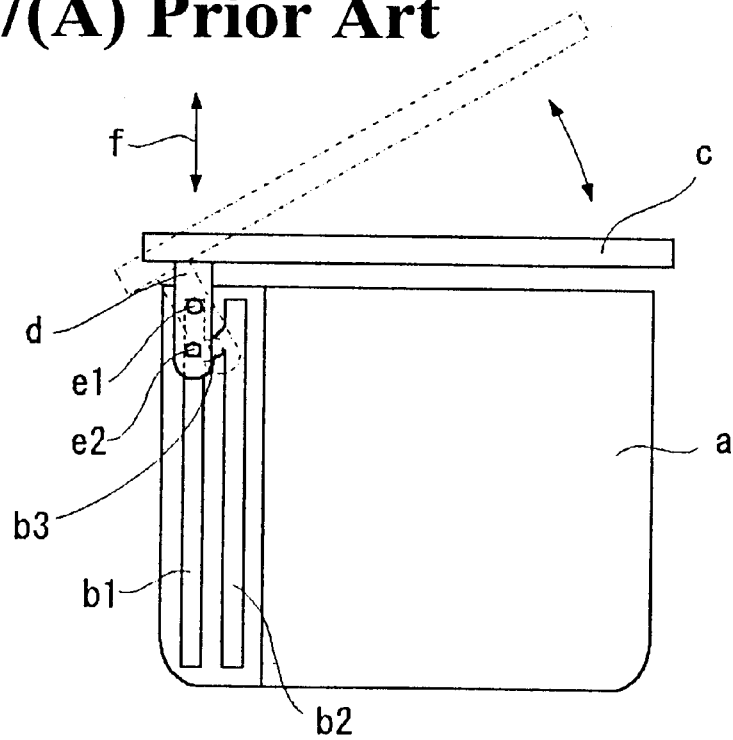
Figure 7B:
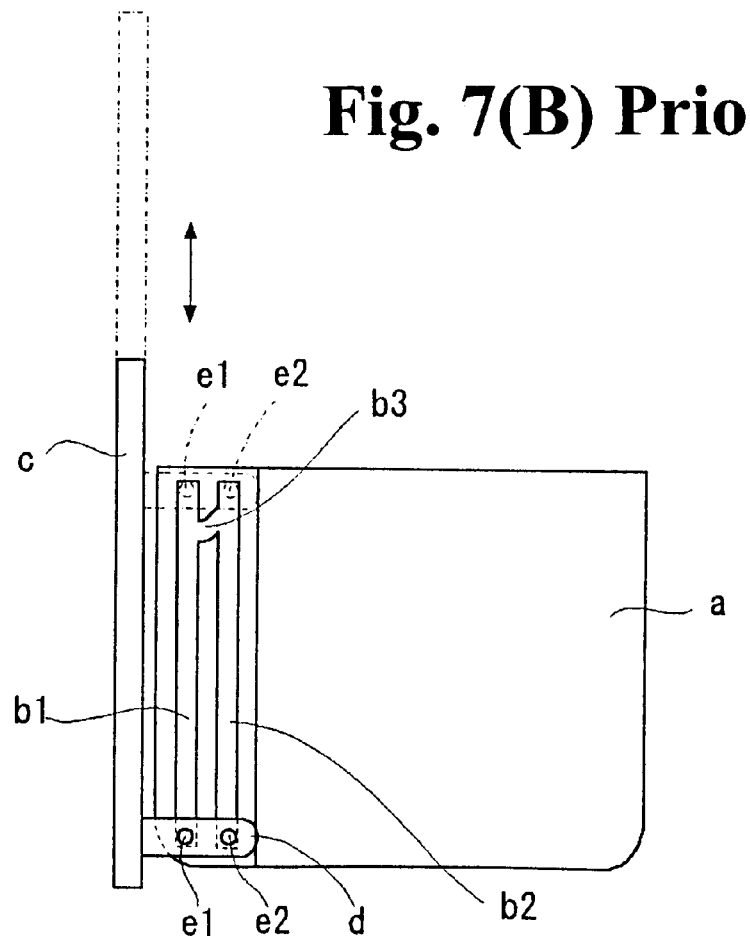
FIG. 7(B) shows a state where the covering member is opened and stored.

Furthermore, in the open-close mechanism of the embodiment, the covering member 2 includes the guide projections 5a, 5b, and 6 disposed in a triangle shape. When the covering member 2 turns, the first guide projection 5a and the second guide projection 6 are guided to slide inside the branch grooves 31a, 31b, respectively, as described above. When the covering member 2 slides, the first guide projections 5a, 5b are guided into the first guide groove 3a, and the second guide projection 6 is guided into the second guide groove 3b, so that the open-close mechanism moves smoothly as compared to the conventional mechanism, as shown in FIGS. 7(A) and (B), in which the one guide projection e2 is used when turning and the two guide projections e1, e2 are used when sliding.

In the guide mechanism of the open-close mechanism of the covering member according to the embodiment, the first guide projection 5a and the second guide projection 6 slide inside the arc-shaped branch grooves 31a, 31b, respectively, when the covering member 2 is turned. When the covering member 2 is closed, the guide projections 5a and 6 are located inside the branch grooves 31a, 31b, respectively, thereby reducing the wobbling of the covering member 2 in the sliding direction. In addition, when the covering member 2 in the closed state is turned and slides, the guide projections 5a and 6 slide inside the arc-shaped branch grooves 31a, 31b, respectively. Then, along with the turning motion of the covering member 2, the guide projections 5a and 6 move to the first guide groove 3a and second guide groove 3b, respectively, from the state that the guide projections 5a and 6 are located inside the branch grooves 31a and 31b, respectively, thereby making it possible to move the open-close mechanism of the covering member from the turning motion to the sliding motion very smoothly without getting stuck inside the sliding groove due to the wobbling of the guide projections like in the conventional open-close mechanism of the covering member as described above.

According to the guide mechanism having the guide projections 5a, 5b, and 6, the guide grooves 3a, 3b, and the branch grooves 31a and 31b, only when the first guide projection 5b is located at the front end of the first guide groove 3a (as in the states in FIGS. 6(A) and 6(B)), in other words, only when the covering member 2 is located at the end of the sliding motion, the first guide projection 5a and the second guide projection 6 can move into the branch grooves 31a, 31b, respectively, so that the covering member 2 can turn. When the first guide projection 5b is located at an entrance of the branch groove 31a (in the state in FIG. 6(C)), the first guide projection 5a and the second guide projection 6 are restricted by the first guide groove 3a and the second guide groove 3b, respectively, so that the guide projection 5b can not turn into the branch groove 31a around either of the guide projections 5a or 6.

Therefore, when the guide projections 5a, 5b, and 6 slide back and forth inside the first and second guide grooves 3a, 3b, in other words, in the middle of the sliding motion of the covering member 2, the covering member 2 can not be turned. Thus, the covering member can slide reliably in a stable position and can turn reliably only at the end of the sliding motion, thereby operating the open-close movement of the covering member 2 very reliably. In the abovementioned embodiment, as shown in FIGS. 6(a)–6(d), a front portion of the branch groove 31b of the second guide groove 3b is formed in a slightly narrow shape, so that the guide projection 5b is reliably prevented from moving into the branch groove 31a in the state in FIG. 6(C), thereby operating the open-close movement of the covering member 2 very stably.

The guide mechanism, the open-close mechanism with the guide mechanism, and the interior equipment for the automobile with the open-close mechanism of the invention are not limited to the above embodiments. The configurations and applications of each part can be modified. For example, the first and second guide grooves 3a, 3b and the branch grooves 31a, 31b can be grooves depressed on both sides of the box-shape main body 1. The supporting pieces 21 provided in the covering member 2 can be formed directly in the covering member 2 without using the metal plate. Moreover, the Conston spring 42 can be replaced with a small-sized motor as a driving source to automate the open-close movement of the covering member 2, or can be a manual operation without the driving source.

In addition, the guide mechanism of the invention is not limited to the operation of the covering member of the interior equipment for the automobile. The guide mechanism also can be used for other applications. For example, the guide mechanism can be used for guiding various covering members and door members in addition to the covering member of the interior equipment for the automobile. The guide mechanism can be used suitably as a guide mechanism for sliding and turning goods other than the covering members and the door members. For example, the guide mechanism can be used for sliding and turning the liquid crystal display panel itself of the car navigation system as described in the covering member 2 of the embodiment, and the liquid crystal display panel can be stored in the instrument panel of an automobile and can be pulled out when it is used.

As explained above, according to the guide mechanism for sliding and turning motions of the invention, when the moving member such as the covering member of the interior equipment for the automobile is slid and turned at the end of the sliding motion, the sliding and turning motions can be guided reliably and stably and the moving member can be slid and turned smoothly. With the guide mechanism, the open-close mechanism of the covering member can be operated to open and close stably and smoothly.

While the invention has been explained with reference to the specific embodiments of the invention, the explanation is illustrative and the invention is limited only by the appended claims.

What is claimed is:

1. A open-close mechanism for guiding sliding and turning motions, comprising:

a base member, a moving member arranged to move relative to the base member, a first guide groove and a second guide groove formed on one side of the base member parallel to each other, said first guide groove having a first branch groove extending therefrom at one side thereof and said second guide groove having a second branch groove extending therefrom at one side thereof, and two first guide projections slidably situated in the first guide groove and a second guide projection slidably situated in the second guide groove, both being formed on the moving member, said two first guide projections and second guide projection being arranged in a triangle shape so that when one of the two first guide projections reaches an end of the first guide groove, the other of the two first guide projections and the second guide projection are allowed to enter the first branch groove and the second branch groove, respectively, to thereby allow the moving member to rotate around the one of the two first guide projections.

2. A open-close mechanism according to claim 1, wherein said first branch groove extends from the first guide groove at a location away from an end of the first guide groove, and said second branch groove extends from one end of the second guide groove.

3. A open-close mechanism according to claim 2, wherein said first guide projections and second guide projection are arranged so that when said one of the first guide projections reaches the end of the first groove, the second guide projection reaches the one end of the second guide groove.

4. An open-close mechanism according to claim 1, wherein said base member is a box-shape container having an opening, and said moving member is a covering member for covering the opening.

5. An open-close mechanism according to claim 4, wherein said first and second guide grooves are formed on each of two sides of the container relative to the opening, and said covering member has two supporting pieces at two sides thereof, each having the first and second guide projections, said supporting pieces being situated outside the two sides of the base member so that the first and second guide projections on each supporting piece are located in the first and second guide grooves on each side.

6. An open-close mechanism according to claim 4, further comprising a sliding member rotatably connected to an edge of the covering member and capable of sliding parallel to the first and second guide grooves.

7. An open-close mechanism according to claim 6, further comprising a driving source for driving the sliding member in at least one direction so that the covering member moves automatically.

8. An open-close mechanism according to claim 7, wherein said driving source is formed of a Conston spring to slide the sliding member in one direction.

* * * * *